Aug. 23, 1932.   A. H. OELKERS   1,872,797
ENGINE TRUCK
Filed Sept. 9, 1927
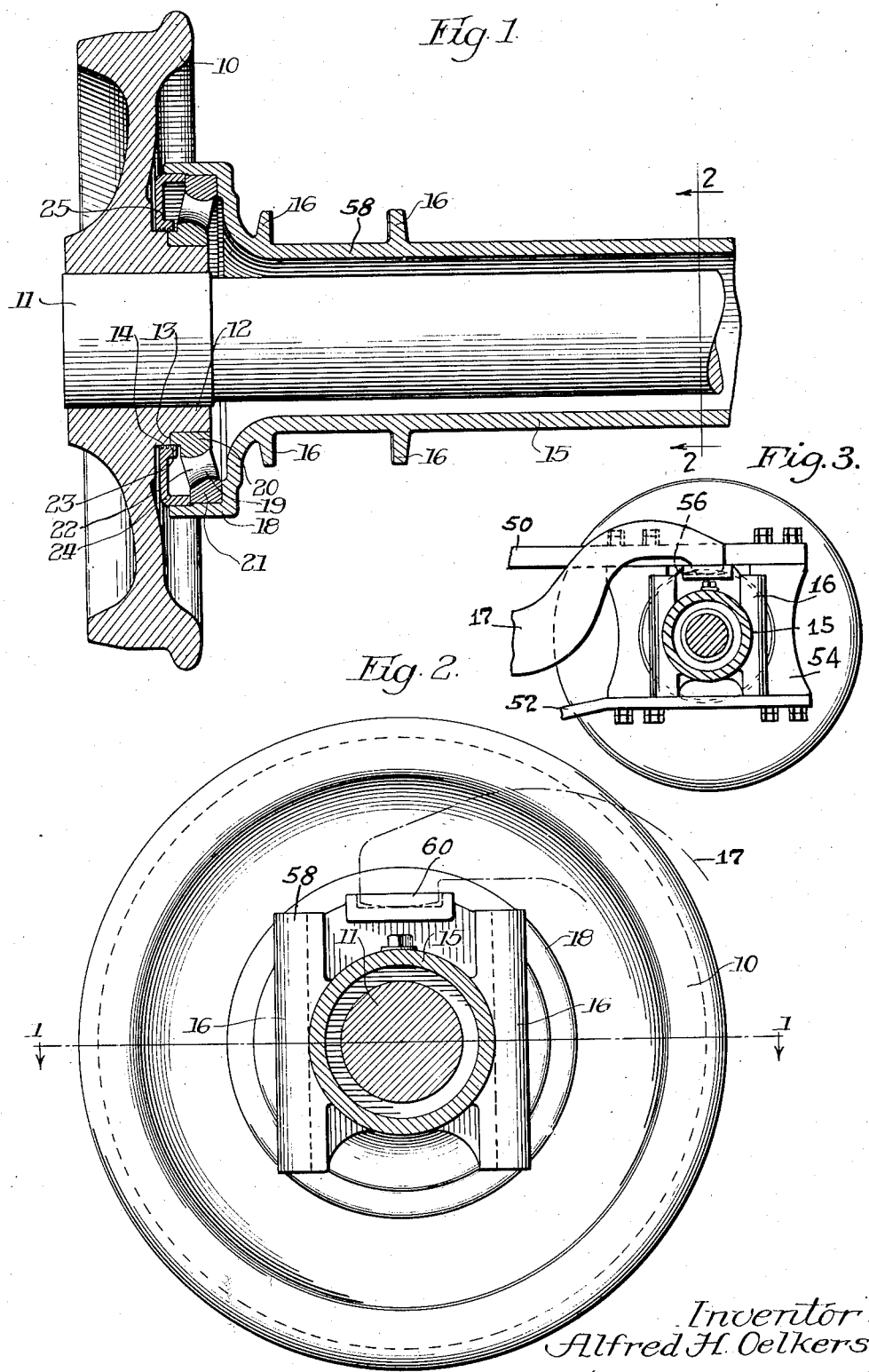
Inventor:
Alfred H. Oelkers Patented Aug. 23, 1932

1,872,797

UNITED STATES PATENT OFFICE

ALFRED H. OELKERS, OF CHICAGO, ILLINOIS, ASSIGNOR TO AMERICAN STEEL FOUNDRIES, OF CHICAGO, ILLINOIS, A CORPORATION OF NEW JERSEY

ENGINE TRUCK

Application filed September 9, 1927. Serial No. 218,426.

This invention pertains to wheel and axle assemblies, and more particularly to roller bearing assemblies for locomotive trucks.

The construction of front engine trucks to which a roller bearing primarily applies is of the pedestal type, having a rigid truck frame with pedestal jaws and journal boxes between wheels which slide vertically in the frame pedestals. Journal boxes of such standard construction now in use receive an ordinary friction bearing rotating on the axle and the outer face of the journal boxes, and have a bearing surface adapted to receive the lateral thrust from the wheels. It will be readily appreciated and is now recognized that roller bearings are much more economical and satisfactory than the usual type of friction bearings now in use and indeed are rapidly replacing the old type friction bearings.

It is therefore an object of this invention to provide a roller bearing assembly for the wheels and axles of the type of truck usually used to carry the front end of locomotives.

Another object is to provide a wheel and axle assembly of improved type which may readily be applied to existing locomotives to convert the present type of truck to one of the roller bearing type, but without the necessity of making any changes in the engine trucks.

Still another object is to provide a wheel and axle assembly wherein there is provided a fixed lubricant carrying axle disposed between wheel supported bearings.

A further object is to provide a wheel and axle assembly of the fixed and rotating axle type wherein the bearings for said assembly are used to provide an additional bearing surface for a bearing recess closing plate.

Still further object is to provide a wheel and axle assembly which is economical to construct and maintain and one which fulfills all the requirements for service.

With these and various other objects in view, the invention may consist of certain novel features of construction and operation as will be more fully described and particularly pointed out in the specification, drawing and claims appended hereto.

In the drawing, wherein like reference characters are used to designate like parts, Figure 1 is a fragmentary sectional plan view of one side of a wheel in axial assembly embodying the invention, the same being taken substantially in the plane as indicated by the line 1—1 of Figure 2;

Figure 2 is a side elevation of the wheel and axle assembly shown in Figure 1, the same being taken substantially in the plane as indicated by the line 2—2 of Figure 1.

Figure 3 is a fragmentary sectional elevation, corresponding substantially to Figure 2, showing the cooperative relation between the pedestals and pedestal jaws.

Although only a part of the wheel and axle assembly is shown and will be described, it is to be understood that such construction is the same on both sides of the truck and for each assembly in the truck.

Referring first of all to Figures 1 and 2, the wheel and axle assembly consists essentially of the wheel 10 shrunk or press-fitted on the axle 11, which is adapted to rotate with said wheel. The wheel 10 is finished to form an inwardly projecting hub 12 finished with a hub face 13 which may be substantially perpendicular to the axis of the axle, said face 13 terminating in a surface 14, the surface elements of which are preferably parallel to the axis of the axle. It may then be said that in effect there have been formed two concentric hubs 12 and 14 both integral with the wheel 10 and in stepped relation to each other. The wheel-encircling housing 15 may be provided, which in effect forms a stationary axle, said housing being formed with pedestal jaws 16 on opposite sides of said housing, the top of said housing being formed with equalizer seats 60 of sufficient number and suitably placed to accommodate the usual (spring) equalizers 17 usually provided on the forward trucks of locomotives. The equalizer seats and pedestal jaws 15 may be proportioned to suit the design of truck when application is being made to existing equipment, but may be of variable shape to suit new designs most generally adapted to the use of this type of roller bearing to locomotive trucks.

The housing 15 terminates in a flared, enlarged or depressed portion 18, said portion forming a bearing or lubricant recess. Any suitable bearings 19 may be provided between the housing and the wheel 10, such bearings being of the self-aligning, Timken type, or any other desired type, the same being provided with inner and outer race rings or bearing cones and cups 20 and 21 having the rollers 22 disposed therebetween. The inner race ring 20 is tightly fitted to the hub 12 in any convenient manner, as by pressing, shrinking, etc., and has one side of said ring tightly fitting against the surface 13 connecting the concentric hubs 12 and 14 of said wheel, and this race ring is preferably provided with a surface 23 which is aligned with and in effect forms a prolongation of the outer hub 14. The outer race ring 21 is fitted to and carried by a portion of the bearing recess 18 of the housing 15, it being understood that said ring is tightly and securely fitted thereto in any manner as described for the inner race ring. A lubricant retaining cap 24 is carried by and secured to the outer end of the depression 18, as by a press-fit, said cap forming a close fit as at 25, preferably both with the hub 14 and the hub forming portion 23 of the inner race ring 20. A lubricant is introduced into the housing 15 at any convenient point, such as by a lubricant plug located at such a point that it may be readily reached.

Referring now particularly to Figure 3, the side frame consists essentially of an upper compression member 50 and a lower tension member 52 spaced apart and secured to vertical pedestals 54 disposed on either side of the axle assembly. The pedestals have vertically extending inner faces 56 having cooperative relation with vertical faces 58 provided on the axle housing 15 and defined by the pedestal jaws 16. As has already been explained, the pedestal jaws 16 are provided with equalizer seats 60 provided on top of said jaws for accommodating the equalizers 17, the equalizers 17 being supported with relation to the main bearing through a suitable suspension arrangement, not shown.

It will be appreciated readily that with this type of wheel and axle assembly such an assembly may be readily applied to the forward trucks of locomotives without the necessity of making any structural changes in the truck frames, pedestals or equalizers. And with this type of roller bearing assembly both vertical loads and lateral thrust are more efficiently taken up. It will be appreciated also that by the position of the various parts of the assembly, as well as their operation, such an assembly is all the more desirable, particularly for locomotive use in place of the old type of friction bearing.

It is to be understood that I do not wish to be limited by the exact embodiment of the device shown, as various and other embodiments of said device will of course occur to those skilled in the art.

I claim:

1. In a device of the character described, the combination of a wheeled axle, the wheels being provided with hubs, bearings on said hubs, and a stationary axle cooperating with said bearings.

2. In a device of the character described, the combination of a wheeled axle, the wheels being provided with inwardly extending hubs, a stationary axle surrounding said wheeled rotary axle and provided with bearing cooperating portions, and bearings disposed between said hubs and said bearing cooperating portions.

3. In a device of the character described, the combination of a wheeled rotary axle, a stationary axle between said wheels, bearings disposed between said axles, and pedestal engaging means and equalizer seats disposed between said wheels.

4. In a wheel and axle assembly, the combination of rotary and stationary axles, lubricant carrying recesses in one of said axles, bearings disposed in said recesses between an axle and the wheels, and pedestal jaws on one of said axles between said wheels.

5. In a wheel and axle assembly, the combination of a wheeled rotary axle, the wheel being provided with concentric hubs, a stationary axle surrounding said rotary axle and being provided with an expanded portion, bearings between one of said hubs and the expanded portion of said stationary axle, and a cover plate between the other of said hubs and the stationary axle.

6. In a wheel and axle assembly, the combination of a wheeled rotary axle, the wheel being provided with inwardly projecting stepped concentric hubs, a stationary axle surrounding at least a part of said rotary axle and being provided with a lubricant recess having parts thereof parallel to and concentric with said hubs, bearings in said recess between one of said hubs and a corresponding concentric part of said recess, and a cover plate carried by the other part of said recess and cooperating with said other hub.

7. In a vehicle frame, the combination of pedestals, an axle, pedestal jaws on said axle cooperating with said pedestals, and a rotary axle extending in and beyond said before named axle, and wheels on said rotary axle disposed externally of said pedestals, and bearings between said axle and wheels.

8. A wheel and axle assembly adapted to be applied to railway trucks without changes thereto, said assembly including a fixed axle having means adapted to cooperate with truck pedestals, and means adapted to receive equalizing means, said axle having bearing recesses, a rotary axle in said fixed axle, wheels on said rotary axle, bearings in said bearing recesses and between said axles, said bearings and wheels being outside said pedestals when the assembly is applied to said trucks.

9. In a wheel and axle assembly, the combination of a wheeled rotary axle, a stationary axle surrounding said rotary axle, a hub on the inside of each of said wheels, and bearings mounted on said hubs and in recesses in said stationary axle.

10. In a device of the character described, the combination of a wheeled rotary axle, concentric stepped hubs on said wheels, bearings mounted on the smaller of said hubs, the inner race rings of said bearings forming prolongations of said other hubs, a stationary axle surrounding said rotary axle and terminating in bearing recesses adapted to receive the outer race rings of said bearings, and cover plates for said recesses disposed between said recesses and the wheel hubs and inner race rings.

11. In a wheel and axle assembly, the combination of fixed and rotary axles, antifriction bearings each including races disposed therebetween, cover plates for closing the ends of one of said axles, each of said cover plates having bearing relation with one of the races of each of said bearings and with a wheel portion.

12. In a wheel and axle assembly, the combination of fixed and rotary axles, antifriction bearings each including races disposed therebetween, cover plates for closing the ends of one of said axles, each of said cover plates having bearing relation with one of the races of each of said bearings and with another member.

13. In a wheel and axle assembly, the combination of fixed and rotary axles, antifriction bearings each including races disposed therebetween, cover plates for closing the ends of one of said axles, each of said cover plates having a peripheral bearing relation with a plurality of members.

14. In a wheel and axle assembly, the combination of fixed and rotary axles, antifriction bearings each including races disposed therebetween, cover plates for closing the ends of the fixed axle, each of said cover plates having a peripheral bearing relation with a plurality of members.

15. In a wheel and axle assembly, the combination of a wheeled rotary axle, the wheels being provided with a bearing receiving portion, and bearings for said axle adjacent the wheels, each of said bearings being so disposed as to have cooperative engagement with said bearing receiving portion.

16. In a wheel and axle assembly, the combination of a wheeled rotary axle, a casing for said axle, said casing having pedestal engaging portions and terminating in lubricant recesses, the ends of which extend within portions of the wheels, bearings between the axle and casing, and means for closing said lubricant recesses disposed between said casing and said bearings.

17. In a wheel and axle assembly, the combination of a wheeled rotary axle, a casing for said axle, said casing having pedestal engaging portions and terminating in lubricant recesses, the ends of which extend within portions of the wheels, bearings between the axle and casing, and means for closing said lubricant recesses disposed between said casing and hubs of the wheels.

18. In a wheel and axle assembly, the combination of a wheeled rotary axle, a casing for said axle, said casing having pedestal engaging portions and terminating in lubricant recesses, the ends of which extend within portions of the wheels, bearings between the axle and casing extending within said portions of the wheels, and means for closing said lubricant recesses having cooperative relation with a portion of said bearings.

Signed at Chicago, Illinois, this 6th day of September, 1927.

ALFRED H. OELKERS.